Patented Feb. 28, 1928.

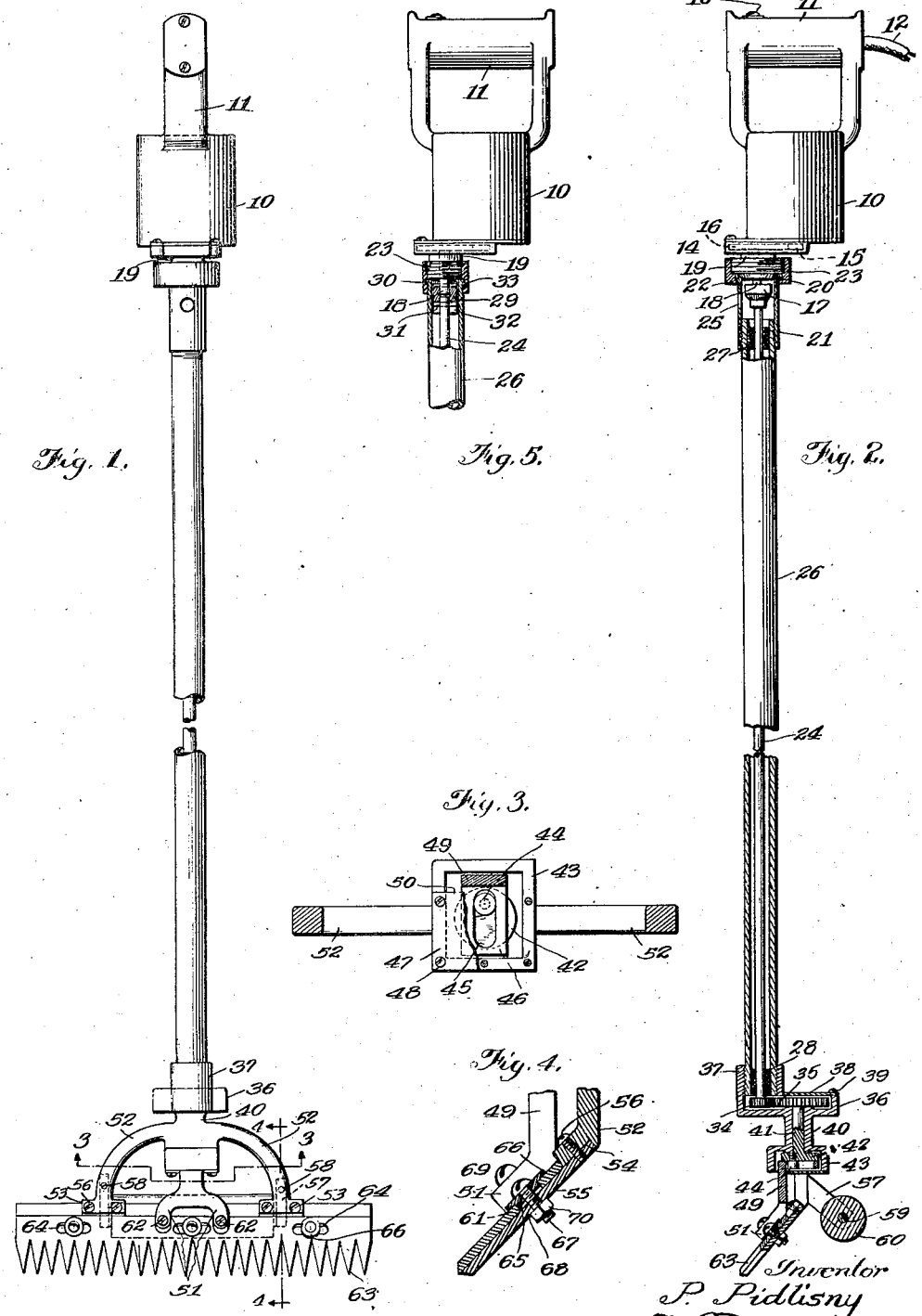

1,660,764

UNITED STATES PATENT OFFICE.

PAUL PIDLISNY, OF CHICAGO, ILLINOIS.

LAWN MOWER AND GARDEN TRIMMER.

Application filed May 10, 1926. Serial No. 107,935.

The present invention relates to lawn mowers and garden trimmers, and for its main object it has the provision of a device which may be simple in construction, capable of easy manufacture and assembling and which can be manufactured at a very little expense.

A further object of the invention is the provision of a device of the character stated wherein the cutting knives may be operated by means of electric motor.

A further object of the invention is the provision of a lawn mower wherein the electric motor is attached to the pushing bar of the mower and forms an integral part therewith.

With the above general objects in view and others that will appear as the nature of the invention is better understood, the same consists in the novel construction, combination and arrangement of parts hereinafter more fully described, illustrated in the accompanying drawing and pointed out in the appended claims.

In the drawing forming a part of this application, and in which like designating characters refer to corresponding parts throughout the several views, Fig. 1 is a front elevational view of the device;

Fig. 2 is a side view of the device, partly in section and partly in elevation;

Fig. 3 is an enlarged sectional view taken on line 3—3 of Fig. 1;

Fig. 4 is a sectional view through the cutting knives taken on line 4—4 of Fig. 1; and Fig. 5 is a modified form of connection between the motor and the remaining parts of the device.

The invention embodies motor casing 10 with an integrally formed handle 11 through which electric wires 12 pass to the motor and supply the electric current for the motive power of the motor. For connecting or disconnecting the electric circuit switch 13 is provided upon the handle 11. Affixed to the motor casing 10 is a gear box 14 within which pinion 15 from the motor meshes with gear 16 for transmitting the rotary motive power to chuck 17 and from there to the cutting elements hereinafter described.

Integrally formed with said gear 16 is shaft 18 which passes through bearing 19 which is integrally formed with the lower face of gear box 14. The lower end of said bearing 19 is enlarged and is externally threaded as at 20 for the purposes hereinafter described.

The lower end of said bearing 19 is outwardly tapered and is received within the upper inwardly tapered end of tubular casing 21.

Said upper end of casing 21 has a flange 22 for limiting further upward movement of union 23. Said union is inwardly threaded for receiving within the threaded portion the enlarged head of bearing 19. Thus through the medium of said union 23 a connection will be had between tubular casing 21 with bearing 19.

As plainly seen on Fig. 2 chuck 17 is adapted for remaining within tubular casing 21. Shaft 24 normally is clamped by its upper end by chuck 17. For the purpose of connecting to or disconnecting the upper end of shaft 24 from chuck 17 aperture 25 is provided in the tubular casing 21 through which a key may be inserted to the chuck for operating the same.

Shaft 24 is adapted for rotation within pipe 26 which by its upper end is connected to tubular casing 21 as is apparent from Fig. 2. Pipe 26 is provided with bearings 27 and 28 wherein said shaft 24 rotates. The modified form of connection between shaft 18 and shaft 24, illustrated on Fig. 5, comprises sleeve 29 rigidly mounted upon shaft 18 by means of pin 30. The upper end of shaft 24 carries a transversal pin 31 which is adapted for reception within a transverse slot 32 made in the lower end of sleeve 29. In the form of the connection disclosed on Fig. 5 the upper end of pipe 26 is provided with an outwardly flared flange or collar 33 for limiting the upward movement of union 23. It is apparent that on disconnecting said union from the enlarged head of bearing 19 shaft 24 may be readily disconnected from shaft 18 by pin 31 coming out of engagement with sleeve 29.

The lower end of shaft 24 passes beyond the lower end of pipe 26 and carries pinion 34 which meshes with gear 35. Said pinion 34 and gear 35 rest within casing 36. Internally threaded collar 37 which is integrally formed with casing 36 is adapted to receive the lower end of pipe 26 as is clearly shown on Fig. 2. A crescent shaped plate 38 affixed to the side wall of the casing 36 as at 39 provides a closure for said casing 36. On removing said closure an access will be had to pinion 34 and gear 35 for oiling the same.

The lower wall of casing 36 is provided with an integrally formed collar 40 which forms a bearing for shaft 41, the upper end of which is keyed to gear 35.

Integrally formed with shaft 41 is a disk 42 adapted for rotation within a square casing 43 depending from and integrally formed with collar 40. Eccentrically mounted on the lower face of disk 42 is a pin 44 receivable within the oblong slot 45 made in plate 46 which is positioned within casing 43 immediately below the lower face of disk 42. Said plate 46 is narrower than the width of casing 43 permitting the lateral reciprocating sliding movement of plate 46 within casing 43 on being actuated by pin 44 on rotation of disk 42. Cover 47 placed over the mouth of casing 43 incloses said plate 46 within said casing 43. Said cover 47 is affixed to the walls of said casing 43 by means of screws 48, as plainly seen on Fig. 3.

Integrally formed with one end of plate 46 and downwardly depending therefrom is arm 49 which reciprocates with plate 46 on actuation of disk 42 and pin 44. For allowing the reciprocating movement of arm 49 cover 47 does not extend to the adjacent wall of casing 43 but forms slot 50 as seen on Fig. 3. The lower end of arm 49 is provided with brackets 51 which are at an angle in respect of arm 49, as plainly seen on Figs. 2 and 4, for the purposes hereinafter mentioned.

Extending laterally from bearing collar 40 and integrally formed therewith are two arms 52. The lower end of each of said arms 52 is provided with transverse blocks 53. Said blocks are at an angle in respect of each arm 52 and form with the adjacent end of the respective arm a cutaway portion 54 wherein the end of cutting plate 55 is received and affixed to each block 53 by means of screws 56, as clearly shown on Figs. 1 and 4. It is observed that arms 52 are in stationary relation in respect of pipe 26, and it follows that cutting plate 55 will likewise remain in stationary position in respect of the major portion of the device. Rearwardly each arm 52 has projecting brackets 57 affixed to each arm by screws 58. The outer ends of said brackets 57 carry axle 59 of roller 60 facilitating the moving of the lawn mower upon the ground as is obvious. When the device is used for trimming hedges the roller 60 may be disconnected by removing screws 58.

The lower ends of brackets 51 carry the upper cutting plate 61 which is affixed to said brackets by means of screws 62. Said cutting plate 61 is narrower than the lower cutting plate 55 and the former by its upper edge contacts with blocks 53.

Each of said cutting plates 66 and 56 is provided with cutting teeth 63, as plainly seen on Figs 1 and 2, for cutting grass, hedges, etc.

The upper plate is adapted for reciprocatory sliding movement upon the lower plate 55 and longitudinally thereof, and for the purpose that said plate 61 may make uniform movements upon plate 55 and so that it may be operatively attached thereto oblong slots 64 are provided in said plate 61 longitudinally thereof as seen on Fig. 1. Bushings 65 receivable within said slots 64 are provided with integrally formed washers 66 overlying the adjacent portions of plate 61 cooperating with screws 67 for maintaining a uniform sliding movement of plate 61 in respect of plate 55. Said screws 67 are in threaded engagement with plate 55 passing through threaded apertures 68 made in said plate 55. Heads 69 of screws 67 resting upon washers 66 maintain said washers and bushings 65 in the desired position in respect of plate 61 and slots 64. For preventing the creeping movement of screws 67 nuts 70 are provided at the end of each screw.

From the hereinabove made description it will be apparent that on rotation of shaft 24 a rotary movement will be imparted to gear 35 through pinion 34. With gear 35 shaft 41 and disk 42 will be rotated, and the eccentric pin 44 positioned within slot 45 will cause the lateral reciprocatory movement of plate 46, arm 49 and brackets 51. In consequence of which operation plate 61 will also move upon plate 55. Since plate 55 and its teeth 63 are in stationary position in respect of plate 61, any grass or hedge coming between teeth 63 in the two plates will be cut.

While there is described herein a preferred embodiment of the present invention, it is nevertheless to be understood that minor changes may be made therein without departing from the spirit and scope of the invention as claimed.

What I claim as new is:

1. In a lawn mower and garden trimmer, a collar, a casing integrally formed with said collar at the lower end therof, a shaft within said collar, a disk upon said shaft, said disk being adapted for rotation within said casing, a pin eccentrically mounted upon said disk, a plate within said casing, said plate having an oblong slot wherein said pin is receivable, an arm integrally formed with said plate and downwardly depending therefrom, a cutting plate carried by said arm, a plurality of arms laterally projecting from said collar, a cutting plate carried by said arms, said first named cutting plate resting upon said second named plate, and means for imparting a rotary movement to said shaft and said disk for reciprocating said first named cutting plate.

2. In a lawn mower and garden trimmer, a collar having arms thereon, a stationary cutting plate carried by the arms, a disk, a casing for the disk carried by the collar, a pin eccentrically mounted upon said disk, a plate carried by the casing, said plate having a slot therein, said pin being receivable within said slot, an arm carried by the plate and downwardly depending thereform, a cutting plate carried by said arm, said last named cutting plate resting upon said first named cutting plate, and means for imparting a rotary movement to said disk for reciprocating said last named cutting plate.

In testimony whereof I affix my signature.

PAUL PIDLISNY.